May 11, 1926.

F. S. RIPPINGILLE

LIQUID METER

Filed July 17, 1924

INVENTOR:
Frank S. Rippingille
By Richards Geier
Attys.

May 11, 1926.

F. S. RIPPINGILLE

LIQUID METER

Filed July 17, 1924

INVENTOR
Frank S. Rippingille
By Richards, Geier
Attys.

Patented May 11, 1926.

1,583,899

UNITED STATES PATENT OFFICE.

FRANK SIDEBOTHAM RIPPINGILLE, OF BIRMINGHAM, ENGLAND.

LIQUID METER.

Application filed July 17, 1924. Serial No. 726,444.

This invention relates to liquid meters, such as, for example, meters used upon motor vehicles for the purpose of indicating the total volume of liquid fuel consumed during a given period of time or for a given journey or distance travelled.

The invention refers to liquid meters of that type comprising a measuring chamber containing a float, which as it rises or falls, due to the filling and emptying of the chamber, operates suitable registering or indicating mechanism.

The object of the present invention is to provide an improved, simplified and more reliable form of liquid meter.

According to the said invention, the improved meter comprises an upper measuring chamber, an inlet valve for admitting liquid to said measuring chamber, a lower supply chamber adapted to receive liquid from the measuring chamber, a float device in the measuring chamber adapted to operate a registering or indicating device, means whereby the liquid is discharged from the chamber into the lower supply chamber when it reaches a predetermined level in the measuring chamber, a float in the supply chamber adapted to open the inlet valve when the liquid level falls in said chamber, and means operated by said float device whereby the inlet valve is automatically closed when the liquid admitted to the upper measuring chamber rises to the level at which it is discharged into the lower chamber.

Figure 1 of the accompanying drawings is a vertical section of a liquid meter according to one form of the present invention, showing the inlet valve closed.

Figure 1:
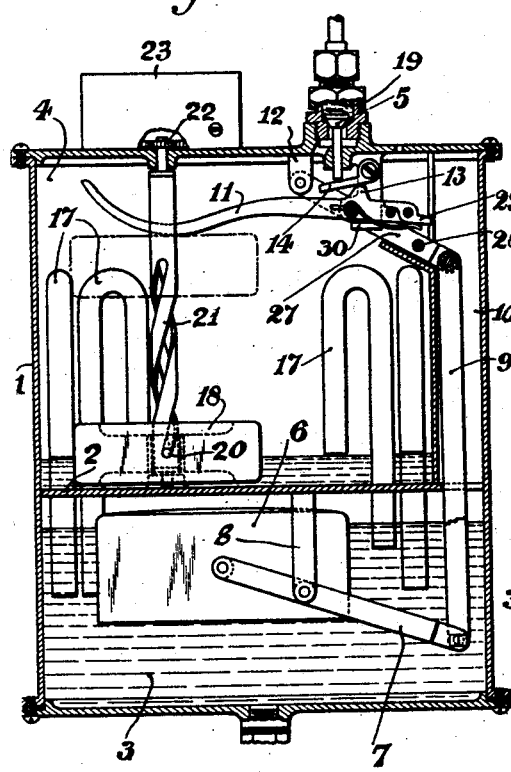
Figure 2:
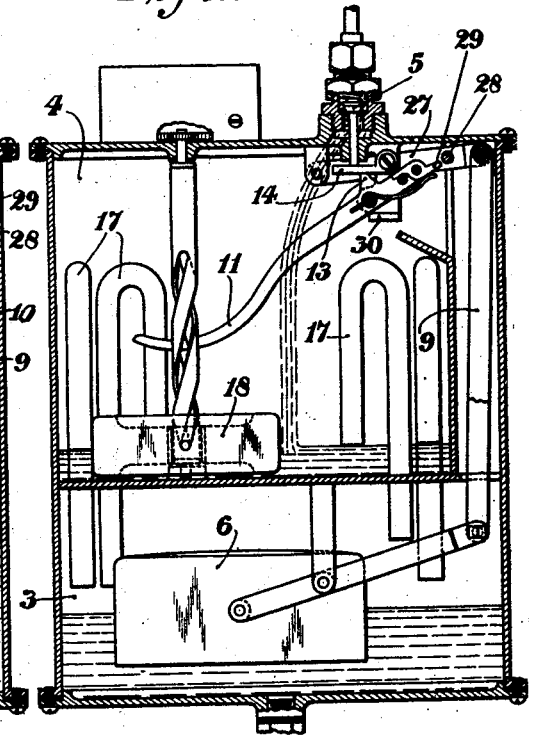
Figure 2 is a similar view but showing the valve opened.

In carrying out one form of the invention in connection with a meter for registering the total consumption of liquid fuel by a motor vehicle during a given time or over a given distance or journey, as shown in Figures 1 and 2, the device comprises a rectangular or other shaped chamber 1 divided by a horizontal partition 2 into two chambers 3, 4, of which the lower chamber 3 is connected to the carburetter while the upper chamber 4 communicates with the fuel reservoir through an inlet valve 5. The lower chamber 3 contains a float 6 which is adapted to fall as the fuel passes to the carburetter and to rise as the said lower chamber is re-filled from the upper vessel, this rising and falling of the float 6 being designed to control the admission of the fuel into the upper chamber 4 as hereinafter described. The said inlet valve 5 is preferably of the cone type but may be of any other suitable type, and is normally closed on to its seating by means of a spring 19, so as to cut off the supply of fuel through the inlet aperture 16 leading to the top chamber, said valve being guided by its depending stem.

In order to discharge the fuel from the upper chamber to the lower chamber when it reaches a certain level in the former, a series of siphons 17, 17, are provided. The upper chamber 4 contains a float 18 conveniently guided by the siphons, and adapted to rise and fall as the vessel fills and empties. This float has a central aperture provided with a pin or projection 20 engaging a quick-pitched helical slot or groove in a vertical shaft 21 adapted to turn in bearings at top and bottom of the chamber so that as the float rises and falls the shaft is rotated. The upper end of the shaft carries outside the chamber, a pinion 22 which is geared to a pointer moving over a graduated dial or scale, contained in a casing 23, which may be arranged upon the upper end of the chamber, as shown, and a pawl-and-ratchet or other one-way clutch device is included in the gearing so that the pointer will be moved forwards each time the float descends but will not be influenced when the float ascends. The dial or scale is graduated in gallons or other suitable units of volume, so that the total quantity of fuel passing through the upper chamber, as shown by the aggregate distance descended by the float, may be conveniently indicated.

The float 6 in the lower chamber is pivotally mounted upon one arm of a horizontal level 7 fulcrumed to a bracket 8 and whose other arm is pivoted to the lower end of a vertical connecting rod 9 passing upward through a chamber 10 separated from the upper chamber 4 by a vertical partition.

The upper end of the connecting rod 9 is attached to one end of a link 27 whose opposite end is pivoted to a bracket 12 on the cover of the upper chamber, this link carrying a striker pin 28 adapted to engage a spring-controlled pawl 29 carried upon one arm of a double-armed cam-lever 11 pivoted to a depending bracket and carrying adjacent the pivot a cam 13 adapted to co-operate with a tappet-lever 14 for opening the inlet valve. Normally this cam-lever 11 is supported by a stop 30 and the pawl 29 is arranged so that when engaged from below by the striker pin 28, as the float 6 falls, the longer arm of the lever 11 will be depressed and the inlet-valve opened, as in Figure 2, the tail end of the said lever 11 extending at a suitable angle in a downward direction. As the float 6 in the lower chamber continues to fall, due to the consumption of fuel from the chamber 3, the striker pin 28 will wipe past the pawl 29, and the cam-lever 11 will be held in its raised position (Figure 2) with the valve open, by the fact that the cam 13 moves slightly beyond the fulcrum of the lever and remains between the said fulcrum and the axis of the valve stem. The upper chamber 4 then fills, and is discharged by the siphons 17, but as the registering float 18 in the said chamber rises it engages the tail end of the cam lever 11 and raises the latter, until, at the moment the siphoning takes place, the cam is moved from beneath the tappet lever, allowing the inlet-valve to be closed by its spring. The cam lever is thus returned to its original position as shown in Fig. 1 against its stop 30 by means of the weight of its long arm, and as the float 6 in the lower chamber rises, the connecting-rod 9 is drawn downwards and the striker pin engages the pawl 29 on the cam-lever, said pawl turning on its pivot to allow the said pin to wipe past it and thus return to its original position. Thus, on the float 6 in the lower chamber again falling the striker pin will lift the cam-lever and open the inlet valve, as above described.

Figure 3:
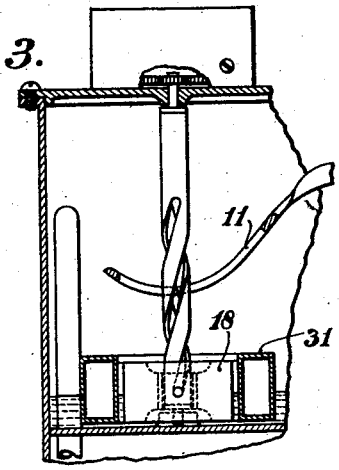
Figure 3 shows an arrangement in which two floats are used in the top chamber.

Instead of the registering float 18 engaging the cam-lever 11 in order to close the inlet valve, a separate float 31 in the top chamber may be employed for this purpose, as shown in Figure 3, said float 31 engaging the tail end of the lever 11.

Figure 4:
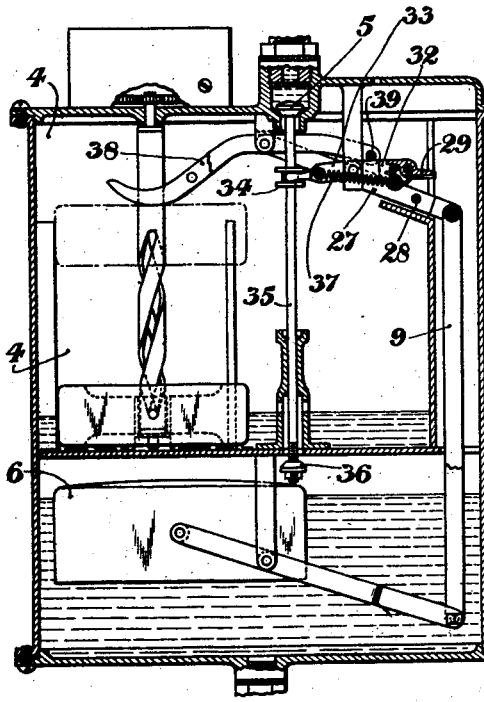
Figure 4 represents another form of the invention in which both inlet and outlet valves are employed the inlet valve being shown closed and the outlet valve open.
Figure 5:
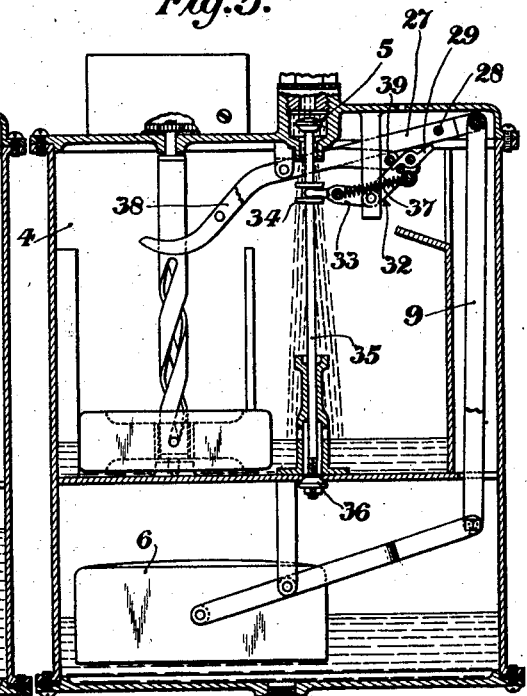
Figure 5 is a similar view, but shows the inlet valve open and the outlet valve closed.

As shown in Figures 4 and 5, a valve may be used for discharging the liquid from the top chamber to the bottom chamber, instead of a siphon. Thus, the upper end of the connecting-rod 9 from the float 6 in the lower chamber 3 is jointed to one end of a nearly horizontal link 27 whose opposite end is hinged to a depending bracket. This link carries a striker pin 28 adapted to engage a pivoted pawl 29 carried by the end of an arm 32 pivoted at its opposite end upon a horizontal pin upon which is also pivoted another arm 33 extending in the opposite direction and having a forked end engaging a collar 34 upon a vertical sliding valve rod 35 carrying an inlet valve 5 at its upper end and an outlet valve 36, controlling the passage of the liquid to the lower chamber, at its lower end, the one valve being open while the other is closed. The two arms 32, 33, are connected by a coiled tension spring 37 which, when the inlet valve is closed and the float 6 in the lower chamber is raised, passes below the pivot pin upon which the arms are mounted, and thus maintains the inlet valve closed, and the outlet valve open as in Figure 5. When, however, the float 6 in the lower chamber falls, the striker pin 28 engages the pawl 29 on the pivoted arms 32 and lifts said arm until the coiled spring 37 is moved above the centre, when it acts upon the other arm 33 to lift the latter and quickly open the inlet valve and close the outlet valve, as shown in Figure 9. The upper chamber 4 thus fills, and the measuring float 18 (or a separate float) rises until it engages and lifts one arm of a trip lever 38 whose other arm is thereupon depressed, causing a pin 39 thereon to bear downwards upon the pawl-carrying arm 32, and depress this arm until the coiled spring 37 passes below the centre, when it acts upon the valve-operating arm 33 to cause the latter to move downwards and close the inlet valve and open the outlet valve, as shown in Figure 4, so that the upper chamber 4 discharges its contents into the lower chamber 3. The float 6 therein then rises, causing the striker pin 28 to descend and wipe past the pawl 29, and on the liquid being withdrawn from the lower chamber the float 6 falls and raises the striker pin which thus again lifts the pawl-carrying arm and causes the inlet valve to open and the outlet valve to close.

It is obvious that the float in the upper chamber may operate the registering mechanism either as it descends or as it rises.

Having fully described my invention, what I desire to claim and secure by Letters Patent is:—

1. A liquid meter comprising an upper measuring chamber, an inlet valve for admitting liquid to said measuring chamber, a lower supply chamber, a float device in the measuring chamber, a registering device operated by said float device, means whereby the liquid is discharged from the measuring chamber into the lower supply chamber when it reaches a predetermined level in the measuring chamber, a float in the lower supply chamber, a lever carrying said float, a rising and falling member connected to said float-carrying lever, a lever for controlling the inlet valve, and adapted to be engaged and operated by the said rising and falling member so that when the float falls in the lower supply chamber the inlet valve is opened, and means whereby the said valve-controlling lever is operated by the float device in the measuring chamber when the said measuring chamber fills to a predetermined level, in order to cause the inlet valve to close.

2. A liquid meter comprising an upper measuring chamber, an inlet valve for admitting liquid to said measuring chamber, a lower supply chamber, a float device in the measuring chamber, a registering device operated by said float device, means whereby the liquid is discharged from the measuring chamber into the lower supply chamber when it reaches a predetermined level in the measuring chamber, a float in the lower supply chamber, a lever carrying said float, a pivoted link, a rod connecting said link to said float-carrying lever, a striker pin on said link, a lever for controlling the inlet valve, and a pawl carried by the said valve lever adapted to be engaged by the striker pin so as to cause the inlet valve to open when the float in the lower chamber falls, the said valve lever being engaged and operated by the float device in the measuring chamber when the said measuring chamber fills to a predetermined level, the pawl allowing the striker pin to wipe past the valve lever when the float in the lower chamber rises.

Signed at Birmingham, in the county of Warwick, England, this 2nd day of July A. D. 1924.

FRANK SIDEBOTHAM RIPPINGILLE.